US011999003B2

United States Patent
Fey et al.

(10) Patent No.: US 11,999,003 B2
(45) Date of Patent: Jun. 4, 2024

(54) ULTRASONIC WELDING DEVICE WITH A V-SHAPED JOINING PART RECEPTACLE

(71) Applicant: SCHUNK SONOSYSTEMS GMBH, Wettenberg (DE)

(72) Inventors: Manuel Fey, Blasbach (DE); Stefan Müller, Wetzlar (DE); Rainer Wagenbach, Merenberg (DE); Waldemar Werner, Reiskirchen (DE); Daniel Günther, Langgöns (DE); Dariusz Kosecki, Biebertal (DE); Stephan Becker, Marburg (DE); Eugen Koch, Grünberg (DE)

(73) Assignee: SCHUNK SONOSYSTEMS GMBH, Wettenberg (DE)

( * ) Notice: Subject to any disclaimer, the term of this patent is extended or adjusted under 35 U.S.C. 154(b) by 0 days.

(21) Appl. No.: 17/767,641

(22) PCT Filed: Nov. 5, 2019

(86) PCT No.: PCT/EP2019/080241
§ 371 (c)(1),
(2) Date: Apr. 8, 2022

(87) PCT Pub. No.: WO2021/089122
PCT Pub. Date: May 14, 2021

(65) Prior Publication Data
US 2024/0100621 A1    Mar. 28, 2024

(51) Int. Cl.
*B23K 20/10* (2006.01)
*B23K 20/26* (2006.01)
(Continued)

(52) U.S. Cl.
CPC .............. *B23K 20/10* (2013.01); *B23K 20/26* (2013.01); *B23K 37/0426* (2013.01)

(58) Field of Classification Search
None
See application file for complete search history.

(56) References Cited

U.S. PATENT DOCUMENTS 10,406,628 B2 *  9/2019  Strobel .................. B23K 20/10
2007/0257088 A1* 11/2007  Steiner ................ B23K 20/004
                                                    228/110.1
(Continued)

FOREIGN PATENT DOCUMENTS

DE   10 2017 111807 A1   11/2017
EP      1 765 545 A1      3/2007
(Continued)

OTHER PUBLICATIONS

WO document (Year: 2014).*
(Continued)

*Primary Examiner* — Devang R Patel
(74) *Attorney, Agent, or Firm* — Maier & Maier, PLLC

(57) ABSTRACT

An ultrasonic welding device includes a sonotrode with a sonotrode surface, a lateral slide with a lateral slide surface, a touching element with a touching surface and an insertion chamber for inserting joining parts. The insertion chamber is defined in a first axial direction (y) on a first side by the sonotrode surface and in a second axial direction (x) on a second side by the lateral slide surface and on a third side opposing the second side by the touching surface. Furthermore, the ultrasonic welding device includes a first receiving element with a first stop edge and a second receiving element with a second stop edge. The first receiving element and the second receiving element are arranged to be movable in relation to each other between a starting position and an end position.

16 Claims, 4 Drawing Sheets

(51) Int. Cl.
*B23K 37/04* (2006.01)
*H01R 43/02* (2006.01)

(56) References Cited

U.S. PATENT DOCUMENTS

2016/0294140 A1* 10/2016 Trube ..................... B23K 20/10
2019/0030639 A1* 1/2019 Schmidt ................. B23K 20/10
2019/0344378 A1 11/2019 Shohara et al.

FOREIGN PATENT DOCUMENTS

| EP | 2 981 389 A1 | 2/2016 | |
|----|----|----|----|
| EP | 3 069 419 A1 | 9/2016 | |
| WO | 2006005509 A1 | 1/2006 | |
| WO | WO-2014104140 A1 * | 7/2014 | ............... H01R 4/02 |
| WO | 2014/161715 A1 | 10/2014 | |
| WO | 2015/067700 A1 | 5/2015 | |
| WO | 2018155721 A1 | 8/2018 | |

OTHER PUBLICATIONS

International Search Report (with English Translation) and Written Opinion (with Machine Translation) issued on Aug. 27, 2020 in corresponding International Patent Application No. PCT/EP2019/080241; 13 pages.

\* cited by examiner

ULTRASONIC WELDING DEVICE WITH A V-SHAPED JOINING PART RECEPTACLE

FIELD

The present invention relates to an ultrasonic welding device.

BACKGROUND

For a wide variety of technical applications, it may be necessary to join two components together in a mechanically secure and/or electrically conductive manner. For example, it may be necessary for various purposes to join cables or their strands together mechanically and in an electrically conductive manner. This can be used, for example, to produce wiring harnesses or cable looms with the aid of which electrical consumers, inside a vehicle for example, can be electrically connected to each other, to an energy source and/or to a control system.

So-called ultrasonic welding was developed to produce substance-to-substance bonds between two electrically conductive components, providing them with high strength and good electrical conductivity. This is a special form of friction welding in which components to be welded, also referred to as joining partners or weld metal, are brought into surface contact with each other and moved against each other under low pressure and high-frequency mechanical vibrations. In this case, the vibrations can be generated with the aid of a sonotrode in which ultrasonic vibrations with frequencies of typically 20 kHz to 50 kHz are generated and transmitted to at least one of the joining partners. Plastic flow then allows the joining partners to permeate or interlock with each other close to the surface without the materials of the joining partners necessarily melting. Ultrasonic welding can therefore be used to bond joining partners together with low impact, quickly and economically.

Ultrasonic welding can also be used in particular for welding metal joining partners, such as strands of cables, for example, which is also referred to as ultrasonic metal welding. For this purpose, the joining partners are generally inserted into a receiving chamber of an ultrasonic welding device between the sonotrode and an anvil, where they are pressed together at a predetermined pressure. The vibrations coupled in via the sonotrode cause the two joining partners to be rubbed together or against each other and as a result to be joined together in a substance-to-substance bond in the solid state. Although the melting point of the metals to be joined is not reached, short-range diffusion can be used to produce a high-strength, homogeneous and durable welded metal joint.

To produce a weld joint with high strength, it is important that the joining partners are correctly positioned relative to each other before they are welded together. When welding stripped cable ends, for example, having two or more cable ends lying side by side on the sonotrode should be avoided. Instead, if possible, the cable ends should be inserted into the ultrasonic welding device so that they lie on top of each other. Depending on the practice level of the operator of the ultrasonic welding device, correctly inserting the cable ends may require more or less time.

EP 2 981 389 B1, for example, describes a lateral slide with a tiltable front face by means of which cable ends can be arranged on top of each other in a welding chamber.

SUMMARY

There may be a requirement for an ultrasonic welding device into which joining parts can be inserted with as little effort as possible so that they are in the most favorable position for a subsequent welding process.

Such a requirement can be met by the subject matter of the independent claim. Advantageous embodiments are defined in the dependent claims and the following description.

A first aspect of the invention relates to an ultrasonic welding device which comprises a sonotrode with a sonotrode surface, a lateral slide with a lateral slide surface, a touching element with a touching surface and an insertion chamber for inserting joining parts. The insertion chamber is defined in a first axial direction on a first side by the sonotrode surface and in a second axial direction on a second side by the lateral slide surface and on a third side opposing the second side by the touching surface. Furthermore, the ultrasonic welding device comprises a first receiving element with a first stop edge and a second receiving element with a second stop edge. The first receiving element and the second receiving element are arranged to be movable in relation to each other between a starting position and an end position. In the end position, the first stop edge and the second stop edge are brought together opposite an open side of the insertion chamber to form a joining part receptacle for receiving the joining parts. In the starting position, the first stop edge and the second stop edge are moved apart. In this case, the joining part receptacle is v-shaped in order to position the joining parts in the insertion chamber in the first axial direction and the second axial direction.

Without limiting the scope of the invention in any way, ideas and possible features relating to embodiments of the invention may be considered to be based, inter alia, on the thoughts and findings described below.

An insertion chamber may be understood as a chamber into which the joining parts are inserted before a welding process. The insertion chamber may be defined on at least three sides so that the joining parts can only be accommodated in a limited volume.

The sonotrode surface may extend at least in sections between the lateral slide surface and the touching surface. The second axial direction, for example, may be aligned orthogonal to the first axial direction or parallel to the sonotrode surface. This means that the sonotrode surface may be aligned approximately, i.e. within a predetermined tolerance range, orthogonal to the lateral slide surface or touching surface. Alternatively, it is possible for the sonotrode surface to be aligned at a slight angle to the lateral slide surface or touching surface. The lateral slide surface and the touching surface may be aligned approximately, i.e. within a predetermined tolerance range, parallel or even at a slight angle to each other.

In a third axial direction, the insertion chamber may be open at least in sections on at least one side. In this case, the third axial direction may be aligned orthogonal to the first axial direction and the second axial direction.

For example, the insertion chamber may be defined on the left by the lateral slide surface, i.e. a surface of the lateral slide, and on the right by the touching surface, i.e. a surface of the touching element. The insertion chamber may be defined at the bottom by the sonotrode surface, i.e. by a surface of the sonotrode. On a side opposing the sonotrode surface, for example at the top, the insertion chamber may be open at least in sections to allow the joining parts to be inserted in the first axial direction, for example from above. In the third axial direction, the insertion chamber may be open at least in sections on at least one side, for example at the front and/or rear, to allow the joining parts to be inserted in the third axial direction, for example from the front and/or rear. Expressed differently, the lateral slide surface, the touching surface and the sonotrode surface may surround the insertion chamber like an open frame, in particular like a u-shaped frame.

Particularly for welding so-called inline splices, the insertion chamber may be open at least in sections in the third axial direction on two opposing sides to allow the joining parts to be inserted in mutually opposing directions.

A side defining the insertion chamber may be understood as a side on which the joining parts abut on the lateral slide surface, the touching surface or the sonotrode surface. This means that the joining parts cannot be moved out of the insertion chamber beyond a limit defined by the lateral slide surface, the touching surface or the sonotrode surface. To form such a boundary for the joining parts, it is not absolutely necessary that the respective sides of the insertion chamber are completely covered by the lateral slide surface, the touching surface or the sonotrode surface. Alternatively, the insertion chamber may also be only partially covered on the respective sides as long as it is ensured that the joining parts cannot be moved out of the insertion chamber.

For example, the lateral slide may be arranged to be movable in the second axial direction such that the lateral slide surface and the touching surface can be moved toward or away from each other. In this way, the insertion chamber can be made smaller or larger in the second axial direction. For example, this may be used to specify a maximum width of the insertion chamber.

After the joining parts have been inserted, the insertion chamber may be temporarily reduced to a welding chamber by, on the one hand, moving the lateral slide surface and the touching surface relatively toward each other, for example by moving the lateral slide in the second axial direction, and, on the other hand, by moving the sonotrode surface and an anvil surface of an anvil relatively toward each other, for example by moving the anvil in the first axial direction. In this case, the joining parts may be pressed together with a defined pressure.

The first receiving element and the second receiving element may be moved relatively toward each other when moving into the end position and relatively away from each other when moving into the starting position. For this purpose, both receiving elements may be arranged to be movable. However, it is also possible that only one of the two receiving elements is arranged to be movable. In the end position, the two stop edges may be positioned relative to each other such that an arrangement of the joining parts is limited in the first axial direction and the second axial direction. This may be achieved by having the two stop edges form a v-shape or wedge shape which tapers toward the sonotrode surface in the first axial direction. Expressed differently, the joining part receptacle formed by the two receiving elements may have a v-shaped or wedge-shaped cutout into which the joining parts can be inserted. It can thus be ensured that the joining parts assume a defined position both in the second axial direction relative to the lateral slide surface and the touching surface and in the first axial direction relative to the sonotrode surface.

Bringing the two stop edges together or apart may be understood as a relative movement between the two stop edges with the aim of bringing them closer to each other or moving them away from each other. The two stop edges may be straight and/or curved and may be inclined to the same or different degrees relative to the sonotrode surface. Accordingly, depending on the design of the stop edges, a v-shape or wedge shape may also be understood as an asymmetrical shape or a shape with a contour that is curved at least in sections.

The two stop edges of the joining part receptacle, or their imaginary extension lines, may converge to a point, i.e. a narrowly defined region. A point may also be understood as a curve or a rounded tip. For example, the point may be arranged in an intermediate space between a plane defined by the lateral slide surface and a plane defined by the touching surface. In this case, the two stop edges may or may not touch each other. The v-shape or wedge shape may be symmetrical or asymmetrical, i.e. the legs of the v-shape or wedge shape formed by the two stop edges may include approximately the same or different angles to the sonotrode surface. One of the two stop edges may also be aligned at least approximately orthogonal to the sonotrode surface or at least approximately parallel to the lateral slide surface and/or the touching surface. However, it is expedient if the two stop edges are each aligned at an angle to the sonotrode surface in the end position of the two receiving elements. The two stop edges of the joining part receptacle may further be located in a common plane, i.e. be aligned with each other in the second axial direction, or may also be arranged laterally offset from each other. Such a v-shaped taper may be used to ensure that only one joining part at a time rests on the sonotrode surface during welding, i.e. has direct contact with the sonotrode.

The joining part receptacle may be shaped to allow the joining parts to be moved in the third axial direction. For example, the joining parts may first be inserted or pre-positioned in the joining part receptacle and then be pushed into the insertion chamber by moving them in the third axial direction.

The joining part receptacle may be arranged opposite an open side of the insertion chamber. This may be understood to mean that the insertion chamber is open on a side on which the joining part receptacle is to be arranged when the two receiving elements are in the starting position and is at least partially defined on this side by bringing the two receiving elements together. The joining part receptacle itself may also be arranged outside the actual insertion chamber. This may be understood to mean that, in the third axial direction, the joining part receptacle has a clear gap to the sonotrode surface, for example a gap between 1 cm and 10 cm. In the starting position, for example, the relevant side of the insertion chamber may be accessible without limitation.

For example, by varying an arrangement of the first receiving element relative to the second receiving element, i.e. by varying the end position of the first receiving element and/or the end position of the second receiving element, it is possible to vary an opening angle, which is included by the two stop edges in the end position of the two receiving elements, and/or a respective inclination of the two stop edges relative to the sonotrode surface. Thus, it is possible to adapt the opening angle or the respective inclination of the two stop edges to an overall cross-section of the joining parts or to a joining part with the largest cross-section in each case. Such an adaptation may be made with the intention that, even with varying cross-sections and a varying number of joining parts, if possible the joining part with the largest cross-section is positioned on the sonotrode surface and the other joining parts are positioned on top of each other, or at least on top of the joining part with the largest cross-section, before they are welded together.

Optionally, for example in the case of unfavorable combinations of joining parts, the insertion chamber may be additionally limited by a freely adjustable lateral slide, for example. However, this is not absolutely necessary due to the pre-alignment of the joining parts brought about by the joining part receptacle. In fact, the lateral slide may also be pulled in to such an extent during insertion of the joining parts that the insertion chamber has a maximum width. This may improve the accessibility of the insertion chamber for the operator.

In the simplest case, the two receiving elements may be configured as slidable plates, it being possible for each of the stop edges to be formed by an oblique leading edge of the plates. However, any other embodiments are also possible. For example, the two receiving elements may also be configured as obliquely positioned rods. It is possible, for example, that at least one of the two receiving elements is rotatably or rotatably and slidably mounted. It is substantial that, in the end position of the two receiving elements, the two stop edges form a geometrically defined receptacle for the joining parts by means of which the joining parts are held in a defined position in the first axial direction and in the second axial direction.

Such an approach may simplify insertion of the joining parts into the insertion chamber in that even less skilled operators require little time to stack the joining parts one on top of the other in a defined position before they are pressed together or welded together. In particular, the joining part receptacle may make it easier for the operator to position a joining part with the largest cross-section at the very bottom during insertion, so that only the joining part with the largest cross-section has direct mechanical contact with the sonotrode during welding, while the other joining parts rest on this joining part and/or lie one on top of the other. Depending on the arrangement of the two receiving elements in the end position, it is also possible to specify a particular arrangement of the joining parts in the second axial direction, for example in the horizontal direction. For example, this makes it possible to position the joining parts at a defined distance from the lateral slide surface and/or the touching surface, for example approximately centrally in the insertion chamber between the lateral slide surface and the touching surface. This means that the joining parts may be pre-aligned independently of the user, i.e. may be brought into an approximately ideal position before a welding process.

According to one embodiment, in the end position, the first stop edge in the second axial direction may protrude at least in sections beyond the lateral slide surface. Additionally or alternatively, in the end position, the second stop edge in the second axial direction may protrude at least in sections beyond the touching surface.

Expressed differently, the two receiving elements may be arranged in the end position such that only a portion of the first stop edge or the second stop edge is located in an intermediate space between a plane defined by the lateral slide surface and a plane defined by the touching surface. For example, a distance between the lateral slide surface and the touching surface may specify a maximum width of the insertion chamber. Due to the fact that at least one of the two stop edges protrudes beyond the lateral slide surface or the touching surface, it is possible to limit the width of the insertion chamber toward the sonotrode surface at least on one side, for example downward, while it may remain at a maximum on a side opposing the sonotrode surface, for example at the top. As a result, this may simplify insertion of the joining parts and still prevent joining parts from lying side by side on the sonotrode surface. According to one embodiment, in the end position, the first stop edge may be aligned at an angle to the sonotrode surface. Additionally or alternatively, in the end position, the second stop edge may be aligned at an angle to the sonotrode surface.

In other words, one of the two stop edges may be aligned at least approximately orthogonal to the sonotrode surface, while another of the two stop edges may be aligned at an angle to the sonotrode surface. It is particularly expedient if both stop edges are aligned at an angle to the sonotrode surface. This makes it possible to ensure that, during insertion, the joining parts are brought into a defined position in the second axial direction or are at a particular distance from the lateral slide surface and from the touching surface in the second axial direction. In particular, this makes it possible to position the joining parts centrally in relation to the sonotrode surface or between the lateral slide surface and the touching surface. This may have a positive effect on a welding result. As already mentioned, the stop edges may include approximately the same or different angles to the sonotrode surface.

According to one embodiment, the first receiving element and the second receiving element may be arranged to be movable independently of each other.

In other words, the two receiving elements may be adjustable independently of each other. For example, this makes it possible to adjust the end position of the two receiving elements independently of each other. Thus the joining part receptacle may be flexibly adjusted to different cross-sections of the joining parts.

According to one embodiment, in the end position, the first receiving element may limit a movement of the second receiving element. Additionally or alternatively, in the end position, the second receiving element may limit a movement of the first receiving element.

Expressed differently, in the end position, the first receiving element may form a stop for the second receiving element, the stop specifying the end position of the second receiving element or vice versa. Thus, an inclination of the second stop edge relative to the sonotrode surface may be varied, for example, by changing the end position of the first receiving element, or vice versa.

For example, the first receiving element may be slidably mounted, while the second receiving element may be rotatably mounted. In this case, in the end position, the first receiving element may be configured to limit a rotary movement of the second receiving element. The inclination of the second stop edge relative to the sonotrode surface may depend in this case on an angle of rotation of the second receiving element. Thus, for example, the greater the angle of rotation starting from the starting position, the smaller the inclination may be. A maximum angle of rotation of the second receiving element, and thus a minimum inclination of the second stop edge, is specified in this case by the end position of the first receiving element.

According to one embodiment, the ultrasonic welding device may further comprise a drive device. The drive device may be configured to move the first receiving element and/or the second receiving element between the starting position and the end position by applying a driving force.

A drive device may be understood as a device for moving the two receiving elements by means of a motor. For this purpose, the drive device may comprise an electric motor, for example. A drive device with a pneumatic or hydraulic actuator, for example in the form of a linear actuator, is also conceivable. The drive device may comprise coupling elements for mechanically coupling the first receiving element to the second receiving element and/or guide elements for guiding the respective movement of the two receiving elements. The mechanical coupling, for example, may be configured to translate a movement of the first receiving element into a movement of the second receiving element, taking into account a certain transmission ratio, or vice versa. Additionally or alternatively, the drive device may comprise additional coupling elements for mechanically coupling at least one of the two receiving elements to the lateral slide. Alternatively to such a mechanical coupling, the drive device may include a dedicated actuator element, for example an electric motor, for each of the two receiving elements or also for the lateral slide. In this case, the actuator elements may be adjustable in dependence on each other by means of a corresponding control system without the need for mechanical coupling of the two receiving elements or at least one of the two receiving elements to the lateral slide. The drive device enables precise, reproducible adjustment of the two receiving elements.

According to one embodiment, the ultrasonic welding device may further comprise a control device which is configured to generate a control signal for the drive device based on a predetermined total cross-section of the joining parts. In this case, based on the control signal, the drive device may be configured to move the first receiving element and/or the second receiving element between the starting position and an end position which is adapted to the total cross-section.

The control device, for example, may be configured to process inputs from an operator of the ultrasonic welding device. It is possible, for example, for the control device to calculate a total cross-section or a maximum cross-section of the joining parts based on the operator's inputs. The drive device may be configured to convert the calculated (total) cross-section into a corresponding movement of the two receiving elements or to move them to correspondingly selected end positions. For example, the larger the calculated (total) cross-section, the larger the opening angle of the joining part receptacle may be selected. Furthermore, based on the control signal, the drive device may be configured to adjust a position of the joining part receptacle in the second axial direction and/or a distance between the lateral slide surface and the touching surface corresponding to the calculated (total) cross-section. This embodiment may further simplify operation of the ultrasonic welding device. In particular, this may reduce the number of operating steps to be performed manually.

According to one embodiment, the lateral slide may be arranged to be movable between a starting position and an end position. In this case, in the starting position of the lateral slide, a distance between the lateral slide surface and the touching surface in the second axial direction may be greater than in the end position of the lateral slide.

In other words, a width of the insertion chamber may be changed by moving the lateral slide. In particular, the lateral slide may be arranged to be slidable relative to the sonotrode surface or the touching surface in the second axial direction. A starting position of the lateral slide may be understood as a pulled-in position and an end position as a pulled-out position of the lateral slide.

According to one embodiment, the drive device may be configured to also move the lateral slide between the starting position and the end position by applying a driving force.

In this case, the drive device may be configured to move the lateral slide independently or in dependence on the two receiving elements.

According to one embodiment, the drive device may be configured to move the lateral slide depending on a movement of the first receiving element and/or the second receiving element.

Expressed differently, the lateral slide may be in a first end position if at least one of the two receiving elements is in a first end position, and may be in a second end position deviating from the first end position if at least one of the two receiving elements is in a second end position deviating from the first end position. For example, the lateral slide may be coupled to at least one of the two receiving elements in such a manner that the smaller an opening angle of the joining part receptacle, the smaller a distance of the lateral slide surface to the touching surface, or vice versa. As a result, the lateral slide and the first or second receiving element may be adjusted together in a single step. Thus, operation of the ultrasonic welding device may be further simplified.

According to one embodiment, the first receiving element may be slidably mounted in the second axial direction. Additionally or alternatively, the second receiving element may be slidably mounted in the second axial direction.

Expressed differently, this allows the first or second receiving element to be adjusted parallel to the sonotrode surface. For example, the first receiving element together with the lateral slide may be slidably mounted in the second axial direction. The two receiving elements may be slidably mounted in mutually opposing directions such that the two receiving elements are moved linearly toward each other when moved into their respective end positions, and moved linearly away from each other when moved into their respective starting positions. As a result, mounting of the first or second receiving element may be implemented with little design effort.

According to one embodiment, the first receiving element may be rotatably mounted, additionally or alternatively, the second receiving element may be rotatably mounted.

For example, for reasons of limited installation space, at least one of the two receiving elements may be rotatably mounted. It is also possible that at least one of the two receiving elements is both rotatably and slidably mounted.

According to one embodiment, the ultrasonic welding device may comprise a further first receiving element with a further first stop edge and a further second receiving element with a further second stop edge. In this case, the further first receiving element and the further second receiving element may be arranged to be movable in relation to each other between a further starting position and a further end position. The further first stop edge and the further second stop edge may be brought together in the further end position opposite a further open side of the insertion chamber to form a further joining part receptacle for receiving further joining parts and may be moved apart in the further starting position. In this case, the joining part receptacle may be v-shaped in order to position the further joining parts in the first axial direction and the second axial direction.

For example, the first receiving element and the further first receiving element may each be arranged to the side of the lateral slide, it being possible to arrange the lateral slide movably between the first receiving element and the further first receiving element. Similarly, the second receiving element and the further second receiving element, for example, may each be arranged to the side of the touching element. In this case, the first receiving element together with the further first receiving element may be movable between the starting and the end position. Additionally or alternatively, the second receiving element together with the further second receiving element may be movable between the starting and the end position. For example, the joining part receptacle and the further joining part receptacle may be arranged opposing each other and/or on different sides of the insertion chamber. As a result, joining parts may be inserted into the insertion chamber from different, in particular opposing, sides in a defined orientation. For example, the first receiving element and the further first receiving element may be identical in construction. For example, the second receiving element and the further second receiving element may also be identical in construction.

According to one embodiment, the joining part receptacle and the further joining part receptacle may be arranged on opposing sides of the insertion chamber.

The opposing sides, for example, may be a front or rear side of the insertion chamber aligned in the third axial direction. The joining part receptacle and the further joining part receptacle may be arranged in alignment with each other. However, it is also possible for the joining part receptacle and the further joining part receptacle to be arranged laterally offset from each other. This makes it possible for elongate joining parts, which are to be welded together in the form of an inline splice, to be introduced into the insertion chamber from opposing sides, correctly aligned in each case.

It should be noted that possible features and advantages of embodiments of the invention are explained herein partly with reference to an ultrasonic welding device configured according to the invention and partly with reference to a manner of operating or using the same. A person skilled in the art will recognize that the features described for individual embodiments may be suitably transferred to other embodiments in an analogous manner, may be adapted and/or interchanged to arrive at further embodiments of the invention and possibly synergistic effects.

BRIEF DESCRIPTION OF THE DRAWINGS

Advantageous embodiments of the invention are further explained below with reference to the accompanying drawings, and neither the drawings nor the explanations are to be construed as limiting the invention in any way.

The figures are merely schematic and not to scale. Identical reference numerals in the various drawings denote identical features or features having the same effect.

DETAILED DESCRIPTION

Figure 1:
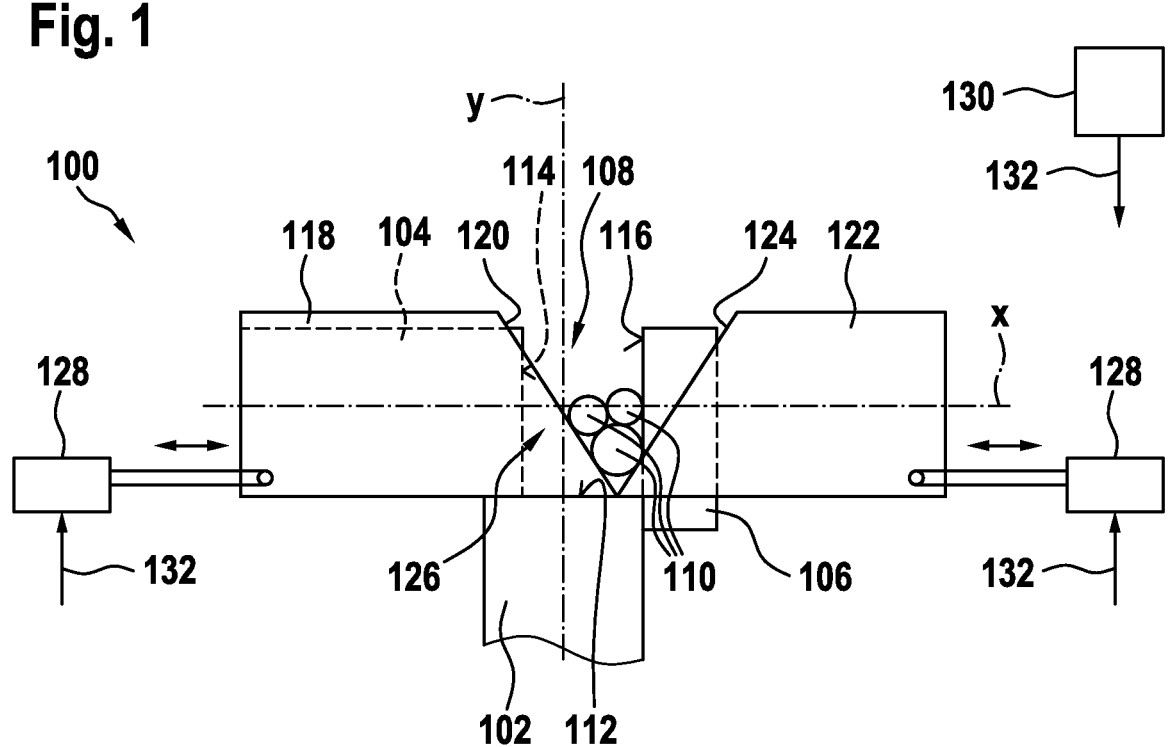
FIG. 1 shows a schematic illustration of an ultrasonic welding device according to an exemplary embodiment of the invention with receiving elements in an end position.
Figure 3:
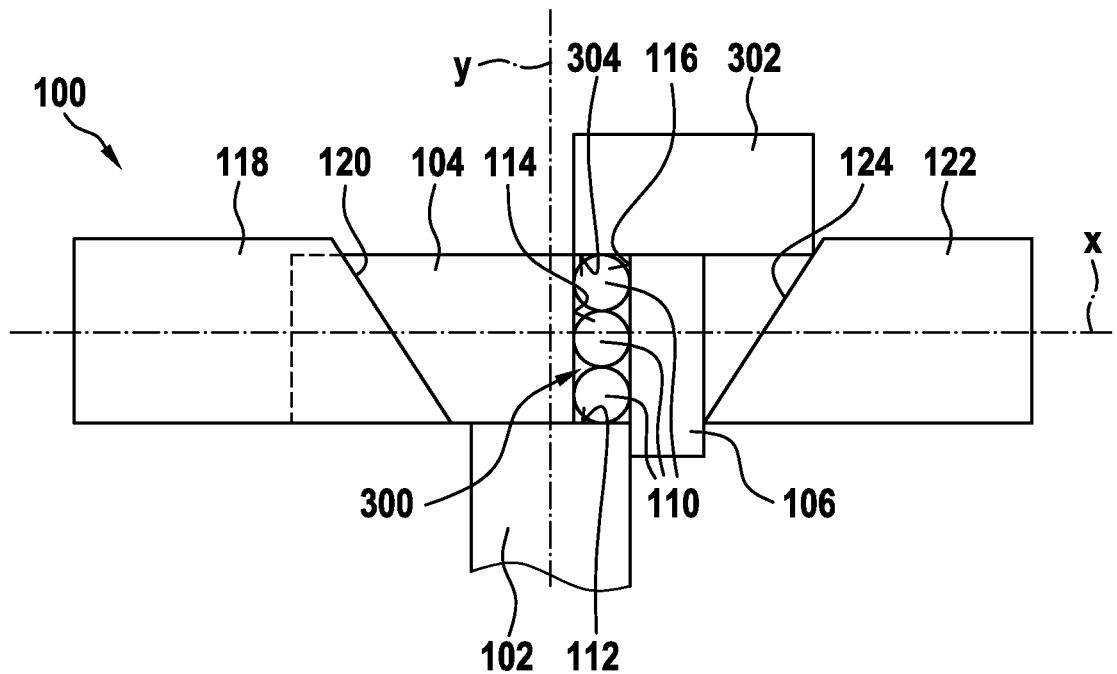
FIG. 3 shows the ultrasonic welding device from FIG. 1 with receiving elements in a starting position.

FIG. 1 shows a schematic illustration of an ultrasonic welding device 100 with a sonotrode 102, a lateral slide 104 and a touching element 106. The sonotrode 102, the lateral slide 104 and the touching element 106 define an insertion chamber 108 for inserting joining parts 110, here, by way of example, of three cables with cable ends to be welded together. The insertion chamber 108 is defined on a first side, here a lower side, by a sonotrode surface 112 of the sonotrode 102. The first side thereby defines the insertion chamber 108 in a first axial direction y. On a second side, here a left side, or on a third side opposing the second side, here a right side, the insertion chamber 108 is defined by a lateral slide surface 114 of the lateral slide 104 or by a touching surface 116 of the touching element 106 respectively. The second side and the third side define the insertion chamber 108 in a second axial direction x orthogonal to the first axial direction y. By way of example, the insertion chamber 108 is open on a fourth side opposing the first side, here an upper side. Similarly, the insertion chamber 108 is open on a fifth side, here a front side, and on a sixth side opposing the fifth side, here a rear side, such that in this example the joining parts 110 can be inserted into the insertion chamber 108 from the front, rear and top. To weld the joining parts 110, the upper side can be closed, for example, by an anvil arranged to be movable in both axial directions x, y, as shown in FIG. 3.

To achieve the best possible welding result, the joining parts 110 should be positioned in the insertion chamber 108 as far as possible one on top of the other in the first axial direction y. In particular, no joining parts 110 should be side by side on the sonotrode surface 112. To prevent this, it is helpful if a joining part 110 with the largest cross-section is positioned at the very bottom and the remaining joining parts 110 are positioned on top of the joining part 110 with the largest cross-section.

Figure 6:
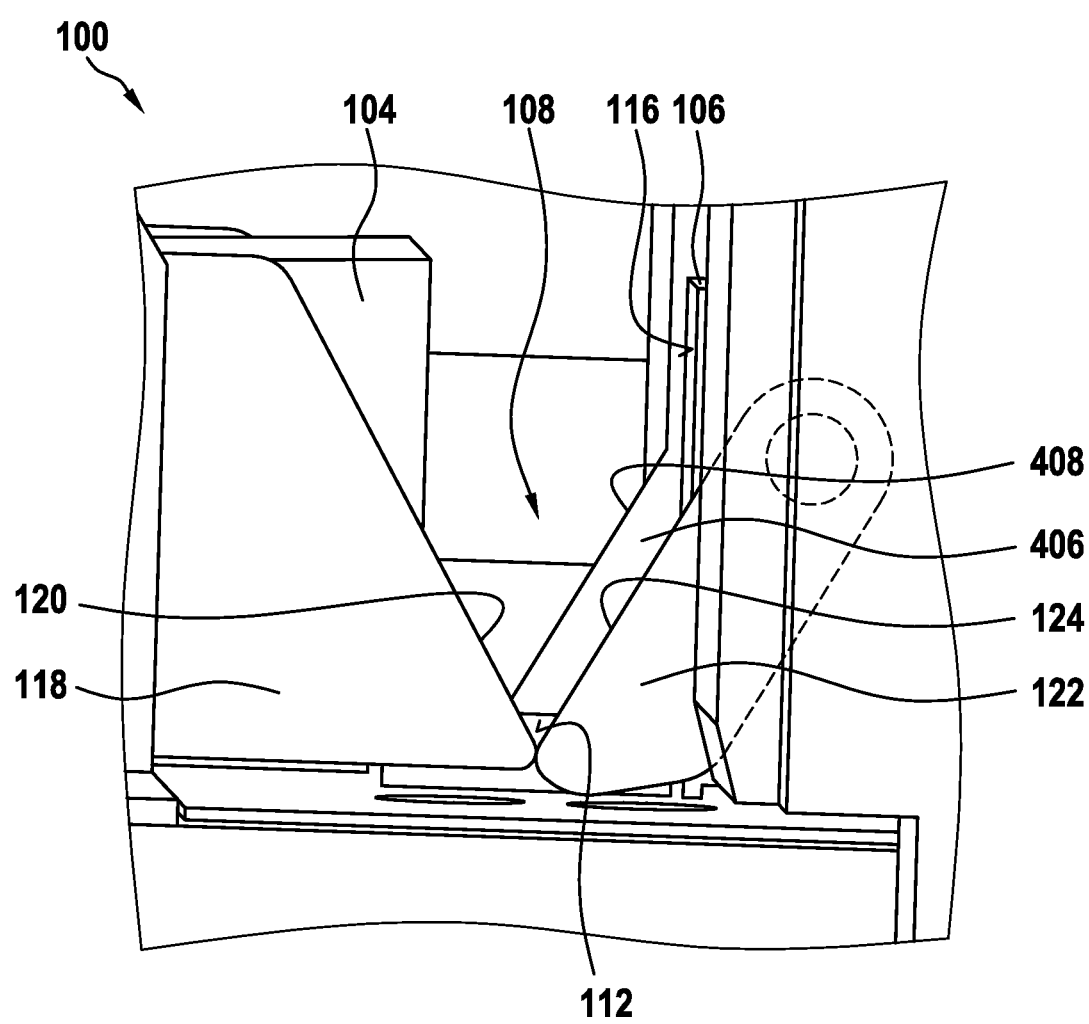
FIG. 6 shows the ultrasonic welding device from FIG. 2 in a perspective view.

To make such a positioning of the joining parts 110 in the insertion chamber 108 easier for an operator of the ultrasonic welding device 100, said ultrasonic welding device 100 comprises a first receiving element 118 with a first stop edge 120 and a second receiving element 122 with a second stop edge 124. The two receiving elements 118, 122 are each arranged to be movable between a starting position and an end position, here, by way of example, to be slidable in the second axial direction x. Additionally or alternatively, at least one of the two receiving elements 118, 122 may be rotatably mounted, as shown in FIG. 6. FIG. 1 shows the two receiving elements 118, 122 each in its end position. In this case, the two stop edges 120, 124, each of which extends at an angle to the sonotrode surface 112, are combined with each other to form a v-shaped joining part receptacle 126 into which the joining parts 110 can be inserted. Expressed differently, the two joined stop edges 120, 124 form a v-shaped or wedge-shaped cutout opposite the front side of the insertion chamber 108. The joining parts 110 may be inserted into this cutout. The v shape of the joining part receptacle 126 has the effect of aligning the joining parts 110 in both the first axial direction y, i.e. perpendicular to the sonotrode surface 112, and in the second axial direction x, i.e. horizontal to the sonotrode surface 112, in such a way that the joining part 110 with the largest cross-section preferably comes to rest in a point of the v shape and the remaining joining parts 110 lie on top of each other or on top of the joining part 110 with the largest cross-section, but not on the sonotrode surface 112.

The end positions of the two receiving elements 118, 122 are selected in this example such that a portion of the first stop edge 120 protrudes beyond the lateral slide surface 114 and a portion of the second stop edge 124 protrudes beyond the touching surface 116. In other words, the point of the v-shape is in an x position, i.e. in a position in the second axial direction x which is located between an x position of the lateral slide surface 114 and an x position of the touching surface 116. Depending on the x position of the point, the joining parts 110 may be placed in the insertion chamber 108 relative to the sonotrode surface 112, for example either centrally or offset more to the left or more to the right. The x position of the point, i.e. the corresponding respective end positions of the two receiving elements 118, 122, may thus be selected depending on a largest cross-section of the joining parts 110.

As shown by way of example in FIG. 1, the two receiving elements 118, 122 may touch each other in their respective end positions, for example in the region of the stop edges 120, 124. In this case, it is possible for the first receiving element 118 to form a stop for the second receiving element 122 in the end position, or vice versa. Expressed differently, the second receiving element 122 may only be displaced in the second axial direction x until it abuts the first receiving element 118 located in its end position. In this sense, the end position of the second receiving element 122 may be specified by the end position of the first receiving element 118. However, it is also possible that the two receiving elements 118, 122 are arranged so as to be movable independently of each other.

In addition, the ultrasonic welding device 100 comprises a drive device 128 for applying a driving force acting in the second axial direction x to the two receiving elements 118, 122, by means of which the two receiving elements 118, 122 are displaced in mutually opposing directions between their respective starting and end positions. By way of example, the drive device 128 is formed here by two separate linear actuators, each of which is coupled to one of the receiving elements 118, 122.

According to an exemplary embodiment, the drive device 128 may be controlled by means of a control device 130. This may be configured to generate a corresponding control signal 132 based on an input of the operator, for example an input regarding a maximum cross-section or a total cross-section of the joining parts 110. The drive device 128 may be configured to move the two receiving elements 118, 122 into corresponding end positions based on the control signal 132. For example, the end positions may be selected by the control device 130 such that the point of the v-shape, i.e. a region in which the stop edges 120, 124 converge, is placed more centrally between the lateral slide surface 114 and the touching surface 116, the larger the largest cross-section and/or the total cross-section of the joining parts 110.

Similarly to the receiving elements 118, 122, the lateral slide 104 may also be arranged to be slidable between a starting position and an end position in the second axial direction x, it being possible, in the starting position of the lateral slide 114, for the lateral slide surface 114 together with the touching surface 116 to specify a maximum width of the insertion chamber 108 in the second axial direction x. Optionally, the lateral slide 104 may be mechanically coupled to at least one of the two receiving elements 118, 122, such that the relevant receiving element and the lateral slide 104 can be moved in dependence on each other when the drive device 128 applies the driving force to the relevant receiving element. In this case, a movement of the lateral slide 104 is to be understood as a linear or non-linear function of a movement of the relevant receiving element, or vice versa. The function may be implemented by a corresponding control curve or path guide.

Figure 2:
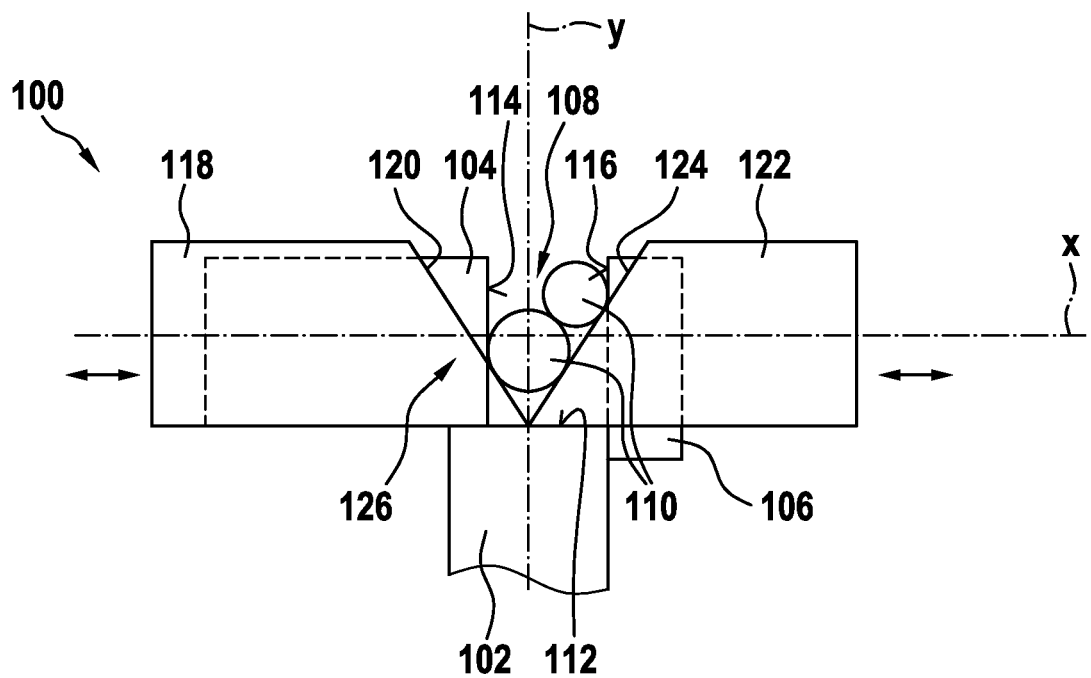
FIG. 2 shows the ultrasonic welding device from FIG. 1 with receiving elements in an alternative end position.

FIG. 2 shows the ultrasonic welding device 100 from FIG. 1 in an alternative end position of the two receiving elements 118, 122 in which the joining part receptacle 126 is shifted further to the left in the second axial direction x compared to FIG. 1. Expressed differently, here the point of the v-shape formed by the two stop edges 120, 124 is located approximately centrally between a plane defined by the lateral slide surface 114 and a plane defined by the touching surface 116, while the point in FIG. 1 is closer to the touching surface 116 than to the lateral slide surface 114. This makes it possible to position joining parts 110 with a larger cross-section compared to FIG. 1 in the insertion chamber 108. It is expedient if the point is located below the sonotrode surface 112 in the first axial direction y. This ensures that sufficient space is available for positioning the joining parts 110 on the sonotrode surface 112 and the bottommost joining part 110 rests superficially on the sonotrode surface 112 during the welding process.

FIG. 3 shows the ultrasonic welding device 100 from FIG. 1 during a welding process. In this case, the two receiving elements 118, 122 are in their respective starting positions. The lateral slide 104 is in its end position. The insertion chamber 108 has been reduced to a welding chamber 300 which, unlike the insertion chamber 108, is closed on the upper side by an anvil 302. The stacked joining parts 110 are pressed together in the welding chamber 300 with a defined pressure and welded together by ultrasonic vibrations of the sonotrode 102. More accurately, in the first axial direction y, the joining parts 110 are pressed together between the sonotrode surface 112 and an anvil surface 304 directed toward the sonotrode surface 112 and, in the second axial direction x, between the lateral slide surface 114 and the touching surface 116. Both receiving elements 118, 122 are in their respective starting positions outside the welding chamber 300.

Figure 4:
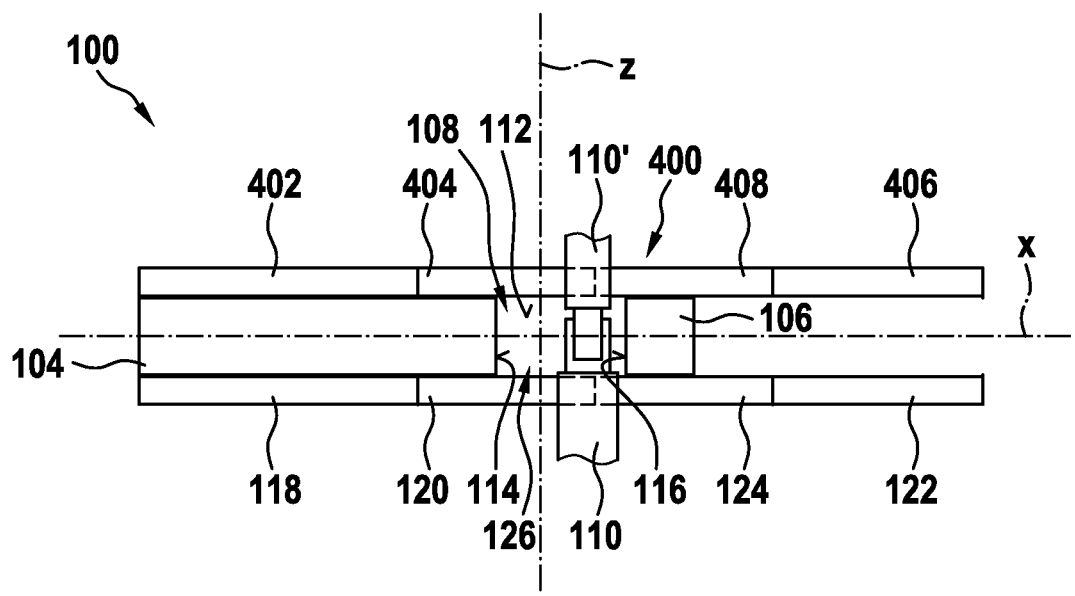
FIG. 4 shows the ultrasonic welding device from FIG. 1 in a view from above.

FIG. 4 shows the ultrasonic welding device 100 from FIG. 1 in a view from above. Here, it can be seen that the joining parts 110 are inserted into the insertion chamber 108 from the front side and further joining parts 110' from the rear side in order to produce an inline splice. For reasons of clarity, FIG. 4 shows only one example of the joining parts 110, 110' in each case. To suitably support the joining parts 110, 110' on both sides of the insertion chamber 108 in the first axial direction y and the second axial direction x, in this example the ultrasonic welding device 100 comprises a further v-shaped joining part receptacle 400 in addition to the joining part receptacle 126 for inserting the further joining parts 110'. Similarly to the joining part receptacle 126, the further joining part receptacle 400 comprises a further first receiving element 402 with a further first stop edge 404 and a further second receiving element 406 with a further second stop edge 408. The further receiving elements 402, 406 are each also arranged to be slidable between a starting position and an end position in the second axial direction x, forming the further joining part receptacle 400 in their respective end positions.

For welding inline splices, it is expedient if the two joining part receptacles 126, 400 are arranged opposite each other, as can be seen in FIG. 4, so that the joining parts 110, 110' positioned in them align with each other in a third axial direction z. The third axial direction z may be aligned orthogonal to the first axial direction y and to the second axial direction x.

The lateral slide 104, for example, may be arranged between the first receiving element 118 and the further first receiving element 402. Additionally or alternatively, the touching element 106 may be arranged between the second receiving element 122 and the further second receiving element 406.

The receiving elements 118, 122, 402, 406, for example, may each be implemented as a simple plate, for example an angle plate, with a bevelled front face as the stop edge. However, other suitable embodiments are possible, for example a stop edge with a curved contour. Additionally or alternatively, the receiving elements 118, 122, 402, 406 may also be arranged to pivot, as already mentioned, as indicated schematically in FIG. 6.

Figure 5:
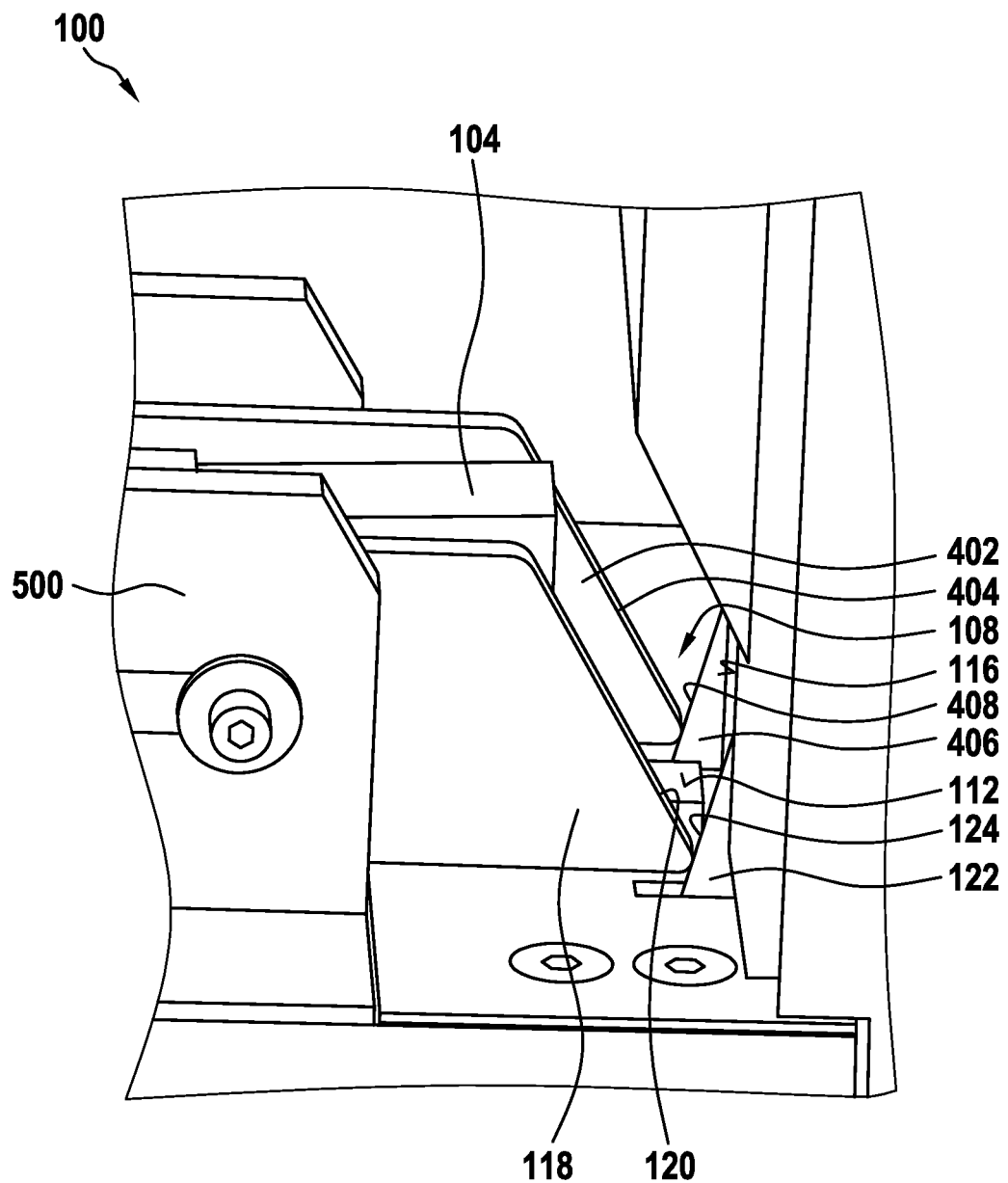
FIG. 5 shows the ultrasonic welding device from FIG. 1 in a perspective view.

FIG. 5 shows the ultrasonic welding device 100 from FIG. 1 in a perspective view. A linear guiding device 500 for linearly guiding the first receiving element 118 and the further first receiving element 402 can be seen. The linear guiding device 500, which may be understood as a component of the drive device 128, may be configured to adjust the lateral slide 104 depending on an adjusting path of the two receiving elements 118, 402. Here, the receiving elements 118, 122, 402, 406 are each in an end position which is particularly suitable for welding electrical cables with a smaller cross-section.

FIG. 6 shows the ultrasonic welding device 100 from FIG. 2 in a perspective view. As already described with reference to FIG. 2, the end positions of the receiving elements 118, 122, 402, 406 are selected here such that, during insertion, electrical cables with a larger cross-section are positioned approximately centrally between the lateral slide 104 and the touching element 106. It can further be seen that, in contrast to the first receiving element 118 and the further first receiving element 402, the second receiving element 122 and the further second receiving element 406 are rotatably mounted here so as to be adjustable between the starting position and the end position.

Various embodiments of the invention are summarized again in other words below.

A travel path of the receiving elements 118, 122, 402, 406, for example, may be specified by a control curve or a correspondingly programmed actuating drive. The second receiving element 122 placed opposite the first receiving element 118 or the further second receiving element 406 placed opposite the further first receiving element 402 may be additionally connected, depending on the number and cross-section of the joining parts 110 to be welded together, in order to form a v-shaped insertion portion for inserting the joining parts 110 or the further joining parts 110'.

As already mentioned, the first receiving elements 118, 402 and/or the second receiving elements 122, 406 may be movable, depending in each case on a movement of the lateral slide 104 corresponding to a predetermined, in particular variable, transmission ratio, for example by means of a control curve.

A respective inclination of the stop edges 120, 124, 404, 408 with respect to the sonotrode surface 112 may be variable, for example by pivoting the relevant receiving elements 118, 122, 402, 406 accordingly.

Finally, it should be noted that terms such as "having", "comprising", etc. do not exclude any other elements or steps and the term "one" does not exclude a plurality. It should further be pointed out that features or steps which have been described with reference to one of the above exemplary embodiments may also be used in combination with other features or steps of other exemplary embodiments described above. Reference numerals in the claims are not to be regarded as a limitation.

LIST OF REFERENCE NUMERALS y first axial direction
x Second axial direction
z Third axial direction
100 Ultrasonic welding device
102 Sonotrode
104 Lateral slide
106 Touching element
108 Insertion chamber
110 Joining part
110' Further joining part
112 Sonotrode surface
114 Lateral slide surface
116 Touching surface
118 First receiving element
120 First stop edge
122 Second receiving element
124 Second stop edge
126 Joining part receptacle
128 Drive device
130 Control device
132 Control signal
300 Welding chamber
302 Anvil
304 Anvil surface
400 Further joining part receptacle
402 Further first receiving element
404 Further first stop edge
406 Further second receiving element
408 Further second stop edge
500 Linear guide device

The invention claimed is:

1. An ultrasonic welding device, comprising:
a sonotrode with a sonotrode surface;
a lateral slide with a lateral slide surface;
a touching element with a touching surface;
an insertion chamber for inserting joining parts;
wherein the insertion chamber is defined in a first axial direction on a first side by the sonotrode surface and in a second axial direction on a second side by the lateral slide surface and on a third side opposing the second side by the touching surface;
a first receiving element with a first stop edge;
a second receiving element with a second stop edge;
wherein the first receiving element and the second receiving element are arranged to be movable in relation to each other between a starting position and an end position;
wherein the first stop edge and the second stop edge are brought together in the end position opposite an open side of the insertion chamber to form a joining part receptacle for receiving the joining parts and are moved apart in the starting position;
wherein the joining part receptacle is v-shaped in order to position the joining parts in the insertion chamber in the first axial direction and the second axial direction.

2. The ultrasonic welding device according to claim 1, wherein, in the end position, the first stop edge in the second axial direction protrudes at least in sections beyond the lateral slide surface; and/or
wherein, in the end position, the second stop edge in the second axial direction protrudes at least in sections beyond the touching surface.

3. The ultrasonic welding device according to claim 1, wherein, in the end position, the first stop edge is aligned at an angle to the sonotrode surface; and/or
wherein, in the end position, the second stop edge is aligned at an angle to the sonotrode surface.

4. The ultrasonic welding device according to claim 1, wherein the first receiving element and the second receiving element are arranged to be movable independently of each other.

5. The ultrasonic welding device according to claim 1, wherein, in the end position, the first receiving element limits a movement of the second receiving element; and/or
wherein, in the end position, the second receiving element limits a movement of the first receiving element.

6. The ultrasonic welding device according to claim 1, further comprising:
a drive device which is configured to move at least one of the first receiving element and the second receiving element between the starting position and the end position by applying a driving force.

7. The ultrasonic welding device according to claim 6, further comprising:
a control device which is configured to generate a control signal for the drive device based on a predetermined total cross-section of the joining parts;
wherein, based on the control signal, the drive device is configured to move at least one of the first receiving element and the second receiving element between the starting position and an end position which is adapted to the total cross-section.

8. The ultrasonic welding device according to claim 1,
wherein the lateral slide is arranged to be movable between a starting position and an end position;
wherein, in the starting position of the lateral slide, a distance between the lateral slide surface and the touching surface in the second axial direction is greater than in the end position of the lateral slide.

9. The ultrasonic welding device according to claim 6,
wherein the lateral slide is arranged to be movable between a starting position and an end position;
wherein, in the starting position of the lateral slide, a distance between the lateral slide surface and the touching surface in the second axial direction is greater than in the end position of the lateral slide;
wherein the drive device is configured to also move the lateral slide between the starting position and the end position by applying a driving force.

10. The ultrasonic welding device according to claim 7,
wherein the lateral slide is arranged to be movable between a starting position and an end position;
wherein, in the starting position of the lateral slide, a distance between the lateral slide surface and the touching surface in the second axial direction is greater than in the end position of the lateral slide;
wherein the drive device is configured to also move the lateral slide between the starting position and the end position by applying a driving force.

11. The ultrasonic welding device according to claim 9,
wherein the drive device is configured to move the lateral slide depending on a movement of at least one of the first receiving element and of the second receiving element.

12. The ultrasonic welding device according to claim 10,
wherein the drive device is configured to move the lateral slide depending on a movement of at least one of the first receiving element and of the second receiving element.

13. The ultrasonic welding device according to claim 1, wherein at least one of the following conditions applies:
the first receiving element is slidably mounted in the second axial direction;
the second receiving element is slidably mounted in the second axial direction.

14. The ultrasonic welding device according to claim 1,
wherein the first receiving element is rotatably mounted; and/or
wherein the second receiving element is rotatably mounted.

15. The ultrasonic welding device according to claim 1, further comprising:
a further first receiving element with a further first stop edge;
a further second receiving element with a further second stop edge;
wherein the further first receiving element and the further second receiving element are arranged to be movable in relation to each other between a further starting position and a further end position;
wherein the further first stop edge and the further second stop edge are brought together in the further end position opposite a further open side of the insertion chamber to form a further joining part receptacle for receiving further joining parts and are moved apart in the further starting position;
wherein the further joining part receptacle is v-shaped in order to position the further joining parts in the insertion chamber in the first axial direction and the second axial direction.

16. The ultrasonic welding device according to claim 15,
wherein the joining part receptacle and the further joining part receptacle are arranged on opposing sides of the insertion chamber.

* * * * *